US007360702B2

(12) United States Patent
Haas

(10) Patent No.: US 7,360,702 B2
(45) Date of Patent: Apr. 22, 2008

(54) VERIFIABLE VOTING SYSTEM

(75) Inventor: Bertrand Haas, New Haven, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 11/355,547

(22) Filed: Feb. 16, 2006

(65) Prior Publication Data

US 2007/0187498 A1 Aug. 16, 2007

(51) Int. Cl.
*G06F 17/00* (2006.01)

(52) U.S. Cl. .......................... 235/386; 235/51; 235/57; 235/375; 705/12

(58) Field of Classification Search .................. 235/50, 235/375, 386, 51, 50 A, 50 B, 50 R, 57, 235/487; 705/12; 707/102; 434/306; 283/5; 704/4; 902/2

See application file for complete search history.

(56) References Cited

U.S. PATENT DOCUMENTS

| | | | | |
|---|---|---|---|---|
| 4,641,240 | A | 2/1987 | Boram | |
| 4,717,177 | A | 1/1988 | Boram | |
| 5,189,288 | A | 2/1993 | Anno et al. | |
| 6,009,149 | A | 12/1999 | Langsenkamp | |
| 6,250,548 | B1 | 6/2001 | McClure et al. | |
| 6,314,519 | B1 | 11/2001 | Davis et al. | |
| 6,457,643 | B1 | 10/2002 | Way | |
| 6,540,138 | B2 | 4/2003 | Hall et al. | |
| 6,817,515 | B2 * | 11/2004 | Winnett | 235/51 |
| 6,865,543 | B2 * | 3/2005 | Gibbs, Sr. | 705/12 |
| 6,991,161 | B2 * | 1/2006 | Pazniokas et al. | 235/386 |
| 7,210,617 | B2 * | 5/2007 | Chaum | 235/51 |
| 2001/0035455 | A1 | 11/2001 | Davis et al. | |
| 2002/0019767 | A1 | 2/2002 | Babbitt et al. | |
| 2002/0077886 | A1 | 6/2002 | Chung et al. | |
| 2002/0133396 | A1 | 9/2002 | Barnhart | |
| 2002/0138341 | A1 | 9/2002 | Rodriguez et al. | |
| 2003/0062411 | A1 | 4/2003 | Chung et al. | |

OTHER PUBLICATIONS

Halina Kaminski et al. "Who Counts your votes?"—IEEE Proceedings of The 2005 IEEE International Conference on e-Technology, e-Commerce and e-Service no Mar. 29-Apr. 1, 2005. pp. 598-603. Digital Object Identifier 10.1109/EEE.2005.147.*

* cited by examiner

*Primary Examiner*—Michael G. Lee
*Assistant Examiner*—Pedro A Rojas
(74) *Attorney, Agent, or Firm*—Brian A. Lemm; Angelo N. Chaclas

(57) ABSTRACT

A method of processing votes in an election includes receiving a voter identity for a voter, receiving a vote set for the voter, providing a phrase to the voter based on the received vote set, generating a unique receipt number for the voter and providing the receipt number to the voter, and associating the voter identity and the receipt number with one another in a first function. The method further includes generating a unique vote number for the voter, associating the vote set, the vote number and the receipt number with one another in a second function, and associating the phrase and the vote number with one another in a third function that is provided to the voter. The method includes associating the vote number with the vote set in a fourth function that is accessible for purposes of later verifying proper counting and contesting of a vote.

7 Claims, 6 Drawing Sheets

| CHOICES | ITEMS: ITEM 1 | ITEM 2 | ITEM 3 |
|---|---|---|---|
| CHOICE 1 | | | |
| CHOICE 2 | | | |
| CHOICE 3 | | | |
| CHOICE 4 | | | |
| CHOICE 5 | | | |

FIG. 2A

| CHOICES | ITEMS: ITEM 1 | ITEM 2 | ITEM 3 |
|---|---|---|---|
| CHOICE 1 | RED | FOX | XXXX |
| CHOICE 2 | BLUE | DOG | EATS |
| CHOICE 3 | XXXX | FROG | JUMPS |
| CHOICE 4 | XXXX | BIRD | FLIES |
| CHOICE 5 | GREEN | RABBIT | SITS |

FIG. 2B

| $F_{A(1)}$ | | |
|---|---|---|
| | $P(1)_1$ | $Q(1)_{i_1}$ |
| | $P(1)_2$ | $Q(1)_{i_2}$ |
| | $P(1)_3$ | $Q(1)_{i_3}$ |
| | ⋮ | ⋮ |
| | $P(1)_M$ | $Q(1)_{i_M}$ |

FIG.3

| H | | |
|---|---|---|
| | R(1) | A(1) |
| | R(2) | A(2) |
| | R(3) | A(3) |
| | ⋮ | ⋮ |
| | R(N) | A(N) |

FIG.4

| G | | | |
|---|---|---|---|
| | R(1) | $Q(1)_V$ | V(1) |
| | R(2) | $Q(2)_V$ | V(2) |
| | R(3) | $Q(3)_V$ | V(3) |
| | ⋮ | ⋮ | ⋮ |
| | R(N) | $Q(N)_V$ | V(N) |

FIG.5

| LQ | | | | | |
|---|---|---|---|---|---|
| | V(1) | V(2) | V(3) | • • • • | V(M) |
| | $Q(1)_1$ | $Q(2)_1$ | $Q(3)_1$ | | $Q(M)_1$ |
| | $Q(1)_2$ | $Q(2)_2$ | $Q(3)_2$ | | $Q(M)_2$ |
| | $Q(1)_3$ | $Q(2)_3$ | $Q(3)_3$ | | $Q(M)_3$ |
| | ⋮ | ⋮ | ⋮ | ⋮ | ⋮ |

FIG.6

VERIFIABLE VOTING SYSTEM

FIELD OF THE INVENTION

The present invention relates to voting systems, and in particular to an electronic voting system that enables a voter to cast a vote and later verify that his or her vote is being counted as intended and, if necessary, contest the way the vote is being counted.

BACKGROUND OF THE INVENTION

Most conventional voting systems in place around the world utilize either paper ballots or mechanical voting booths having mechanical switches and levers that, when actuated, increment a plurality of mechanical counters. These conventional systems present a number of problems for election processes. For example, paper ballots can become physically damaged or altered between the time the voter makes his or her selection and the time a ballot-counting machine eventually reads the voter's selection on the ballot. In addition, with paper ballots, voters can inadvertently cast a vote for the wrong candidate by, for example, punching a hole or placing an X next to a different candidate than was intended. Mechanical voting booths, while solving some of the problems presented by paper ballots, present problems of their own. For instance, voting booths are fairly expensive, have many mechanical parts which require routine maintenance and repair, and are typically heavy and cumbersome to move and set up.

More recently, electronic voting systems have been developed with an eye toward solving the problems presented by systems that employ paper ballots and/or mechanical voting booths. However, none of the electronic voting systems developed to date has proven to be secure and efficient enough to result in the widespread use thereof (in place of existing paper ballot and/or mechanical voting booth systems). In addition, most electronic voting systems do not give the voters a receipt by which they can prove how they voted, since such receipts would allow a voter to easily sell or trade their votes with another party or allow another party to coerce a voter to vote in a certain way.

In addition, in current voting systems (mechanical and electronic), the verification that all votes that have been cast have been counted, and have been counted as the voter intended, rests entirely in the hands of voting officials. As such, the voters have no choice but to trust these officials. If a voter believes that his or her vote was not counted at all or was not counted as intended, it is difficult, if not impossible, to prove that to be the case. Thus, there is a need for an electronic voting system that allows voters to verify that their votes have been counted as intended and that will protect against the potential of vote selling/trading.

SUMMARY OF THE INVENTION

The present invention relates to a method of processing votes in an election that allows voters to verify that their votes have been counted as intended and that will protect against the potential of vote selling/trading. The method includes receiving a voter identity for the voter at, for example, an electronic voting machine within a voting precinct. The method further includes receiving a vote set for the voter. The vote set includes a selection of one or more possible choices in the election, wherein each of the choices comes from a respective one or more categories for which votes are being cast in the election. Next, the method includes providing a phrase to the voter based on the received vote set, generating a unique receipt number for the voter and providing the receipt number to the voter, and associating the voter identity and the receipt number with one another in a first function, such as a look-up table. The method also further includes generating a unique vote number for the voter, and associating the vote set, the vote number and the receipt number with one another in a second function, such as a look-up table. The method still further includes associating the phrase and the vote number with one another in a third function, such as a look-up table, and providing the third function to the voter, such as part of a paper receipt. Finally, the method includes associating the vote number with the vote set in a fourth function, such as a look-up table. The fourth function is accessible by the voter for purposes of later verifying his or her vote was counted as intended.

The vote set may include one of a plurality of possible vote sets for the election, and the phrase returned to the voter may be one of a plurality of possible phrases. Each of the possible phrases corresponds to a respective one of the possible votes sets and each of the possible phrases is preferably determined prior to the election. In such a case, the step of providing the phrase to the user includes providing the particular one of the possible phrases that corresponds to the vote set selected by the user. The method may also further include associating each of the possible phrases other than the phrase returned to the voter with a respective one of a plurality of security numbers in the third function.

The method is repeated for a plurality of other voters and at the end of a voting period the first and second functions are provided to at least one election official. Preferably, the first function is provided to a first election official and the second function is provided to a second election official.

The voter may verify that his or her vote was properly counted by remembering the particular phrase that was returned to him or her, and using that phrase to retrieve the correct vote number from the third function. The voter can then access the fourth function to find the retrieved vote number and determine whether the vote number is in the column for the particular vote set that the voter believes he or she selected during the election. If the answer is yes, then that means that the voter's vote was counted correctly. If the voter is not satisfied with the verification, e.g., the voter believes that his or her vote was not counted correctly, then the voter can contest his or her recorded vote by providing his or her voter identity and assigned receipt number to the first election official after said election is over. The first election official will then determine whether the voter identity is associated with the receipt number using the first function. If it is determined that the voter identity is associated with the receipt number, the method further includes referring the voter to the second election official. The second election official will obtain the vote number and the vote set using the second function and the receipt number. The second election official will also determine with which one of the possible votes sets the vote number is associated in the fourth function. The second election official will then determine whether the vote set obtained using the second function matches the vote set obtained from the fourth function. A determination that there is not a match indicates that the vote was not properly counted, and the second election official can launch an investigation to determine the reason for the improper counting.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIG. 2A is a schematic representation of an array showing the possible items and choices that may be available in a particular election;

FIG. 2B is a schematic representation of an example array as shown in FIG. 2A having a word assigned to each vote choice;

FIG. 3 is a schematic representation of a look-up table F according to an aspect of the present invention;

FIG. 4 is a schematic representation of a look-up table H according to an aspect of the present invention;

FIG. 5 is a schematic representation of a look-up table G according to an aspect of the present invention;

FIG. 6 is a schematic representation of a list LQ showing all possible vote sets indexing the columns and vote numbers and security numbers in an election according to an aspect of the present invention;

DESCRIPTION OF THE PREFERRED EMBODIMENTS

Figure 1:
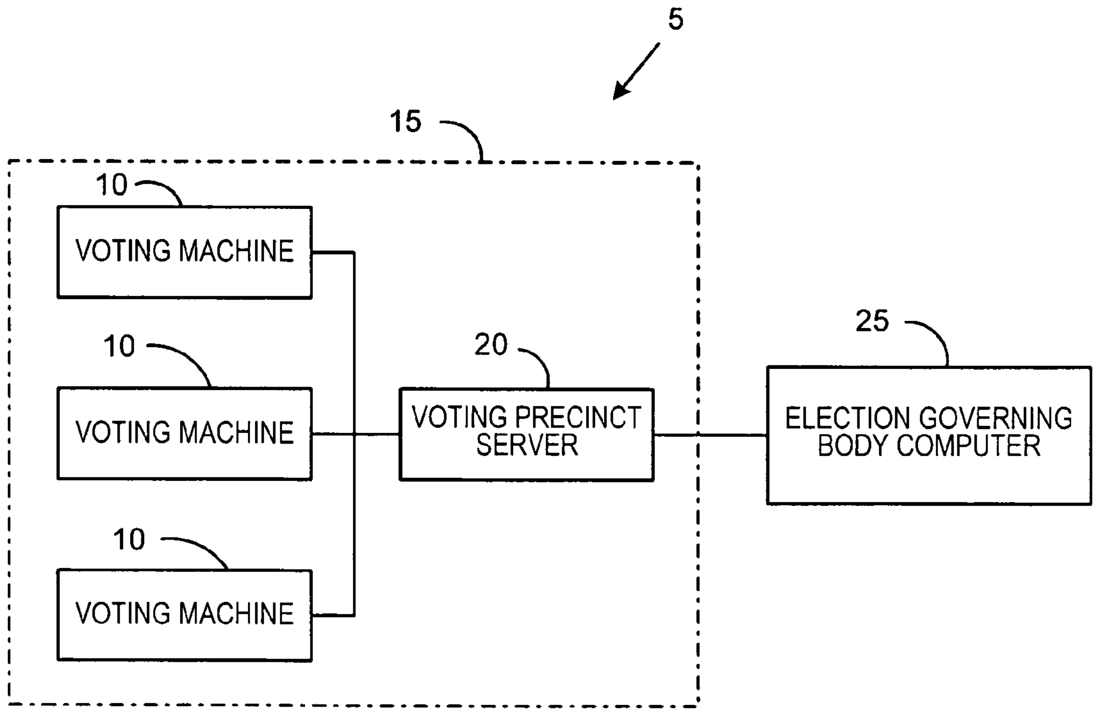
FIG. 1 is a block diagram of a voting system that enables voters to verify that their votes have been counted as intended and that protects against vote trading according to the present invention.

The present invention relates to a voting system that enables voters to verify that their votes have been counted as intended and that protects against vote trading. The system may be implemented in a network 5 as shown in FIG. 1. The network 5 includes a number of computerized voting machines 10 located within a voting precinct 15. While three voting machines 10 are illustrated in FIG. 1, it should be understood that any number of voting machines 10 can be provided. Each of the voting machines 10 is in electronic communication with a voting precinct server computer 20, and may be used by a voter to cast his or her votes as described herein. Voting precinct server computer 20 is in turn in electronic communication with an election governing body computer 25 operated under the direction and control of a governing body that administers and governs the election. In order to describe the operation of the voting system of the present invention, a number of concepts and elements of the system will first be described.

Each voter that will vote using the system of the present invention will have a voter identity A. The voter identity A may include various types of identifying information for the voter, as well as other information to be used in implementing the present invention.

In addition, the present invention assumes an election wherein the number of items or categories to vote for (e.g., president, senator, representative, etc.) is bounded by a number B1, and wherein the number of choices or candidates (preferably including a choice for abstention) in each item or category is bounded by a number B2. For example, in a particular election, the number of items or categories may be three (B1=3) and the number of choices or candidates (including abstention) in each item or category may be a maximum of five (B2=5). In such a case, a 3×5 array may be constructed as shown in FIG. 2A, wherein each entry in the array represents a particular vote that may be cast. When a voter votes, he or she will choose a vote set V consisting of a particular choice or candidate for each of the items or categories. In the example shown in FIG. 2A, each vote set V will include three choices. Each election will thus have M possible vote sets V (i.e., each possible combination of choices that may be constructed from the array). In the example shown in FIG. 2A, the total number M of possible vote sets V will be equal to $B2^{B1}=(5^3)=125$. It should be understood, of course, that not every item will have the same number of choices. For example, Item 1 in FIG. 2A may only have three choices, Item 2 may have four choices, and Item 3 may have four choices. In this situation, the actual number M of possible vote sets V will be equal to 3×5×4=60.

According to an aspect of the present invention, a phrase set S may be created for each voter by assigning one or more words to each entry in the array representing the possible votes. In particular, the one or more words are assigned in a manner such that there are no repetitions in each column as shown in FIG. 2B. There may, however, be word repetitions among the rows. Thus, each vote set V may be represented by a phrase P made up of the appropriate words taken from the array shown in FIG. 2B. For example, the phrase "Blue Fox Sits" would correspond to the following vote set V: $Item_1$=$Choice_2$, $Item_2$=$Choice_1$, $Item_3$=$Choice_5$. As will be appreciated, the number of possible phrases P will be equal to the number M of possible vote sets V. To make each resulting phrase P more memorable, each phrase could be constructed in a mnemonic manner, such as, for example, using an adjective for each word for $Item_1$, using a noun for each word for $Item_2$, using a verb for each word for $Item_3$, and so on, as shown in FIG. 2B. For those items for which all choices are not available, e.g., $Item_1$, $Choice_3$ and $Choice_4$, and $Item_3$, $Choice_1$, as illustrated in FIG. 2B, a vote for those choices can not be made and there is no need to assign one or more words to that selection, as represented by the entry XXXX in FIG. 2B. In addition, each item preferably has a choice for abstaining from voting in the event that a voter does not wish to make any selection from among the candidates running. For example, the entries in the row $Choice_5$ in the array of FIG. 2B could correspond to an abstention.

The phrase set S for each voter is established prior to the election, such as during a registration procedure. Preferably, the phrase set S is created for each voter by the election governing body. However, the voter may change the words in the set S as he or she pleases between elections as long as the forbidden repetitions of words as described above are avoided. Once created, the phrase set S for each voter is included in the voter identity A for the voter. As described in greater detail below, when a voter casts his or her vote using a voting machine 10, a particular phrase P is constructed from the voter's phrase set S based on the particular vote set V selected by the voter. The particular phrase P is returned to the voter, preferably by being displayed on a screen or announced through headphones worn by the voter. The phrase P is, however, not printed to prevent the trading or selling of votes.

The present invention also utilizes a pair of numbers R (called receipt numbers) and Q (called verification numbers consisting of vote numbers and security numbers) that are generated when the voter casts his or her vote (i.e., selects the vote set V) or, in the case of the security numbers only, previously generated. The significance of each of the numbers R and Q, which may be pseudo-random, is discussed in detail below.

The present invention also contemplates the use of a number of functions preferably in the form of look-up tables that relate/tie various pieces of information to one another. In particular, a look-up table F is generated for each voter when he or she votes. The look-up table F ties each possible phrase P from the voter's phrase set S with a particular verification number Q. Specifically, as described in greater detail below, the look-up table F will tie the particular phrase P that was returned based on the vote set V selected by the voter with the particular vote number Q that was generated. The look-up table F also ties each of the other remaining phrases P from the phrase set S with a security number Q (which may or may not be vote numbers for other voters). An exemplary look-up table F for a voter identified by the voter identity A(1) is shown in FIG. 3.

In addition, a look-up table H is utilized to tie each receipt number R that is generated with the particular voter identity A for which it was generated. An exemplary look-up table H for a number of voters N in the precinct 15 is shown in FIG. 4. A look-up table G is utilized to tie together each receipt number R and the associated vote set V and vote number Q. An exemplary look-up table G for a number of voters N in the precinct 15 is shown in FIG. 5. Finally, a look-up table LQ is utilized to list for each possible vote set V in the election (i.e., $V_1$, $V_2$, . . . $V_M$,) each of the vote numbers Q that have been associated with an actual vote cast for that vote set V. An exemplary look-up table LQ is shown in FIG. 6. As described below, for security purposes, the look-up table LQ may also list a number of security numbers Q for each possible vote set V in the election.

Figure 7:
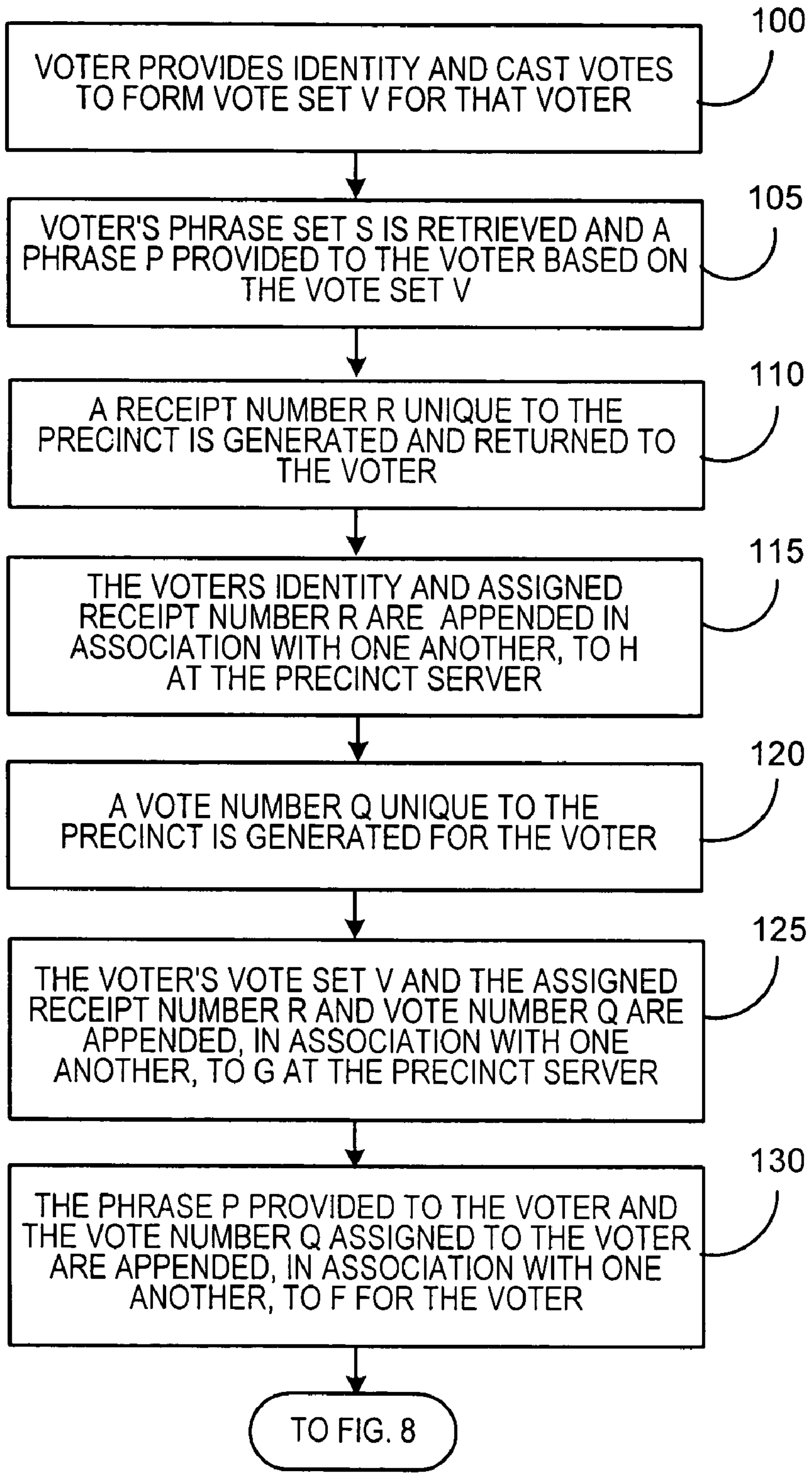
FIGS. 7 and 8 are flowcharts showing a method of casting a vote according to the present invention.
Figure 8:
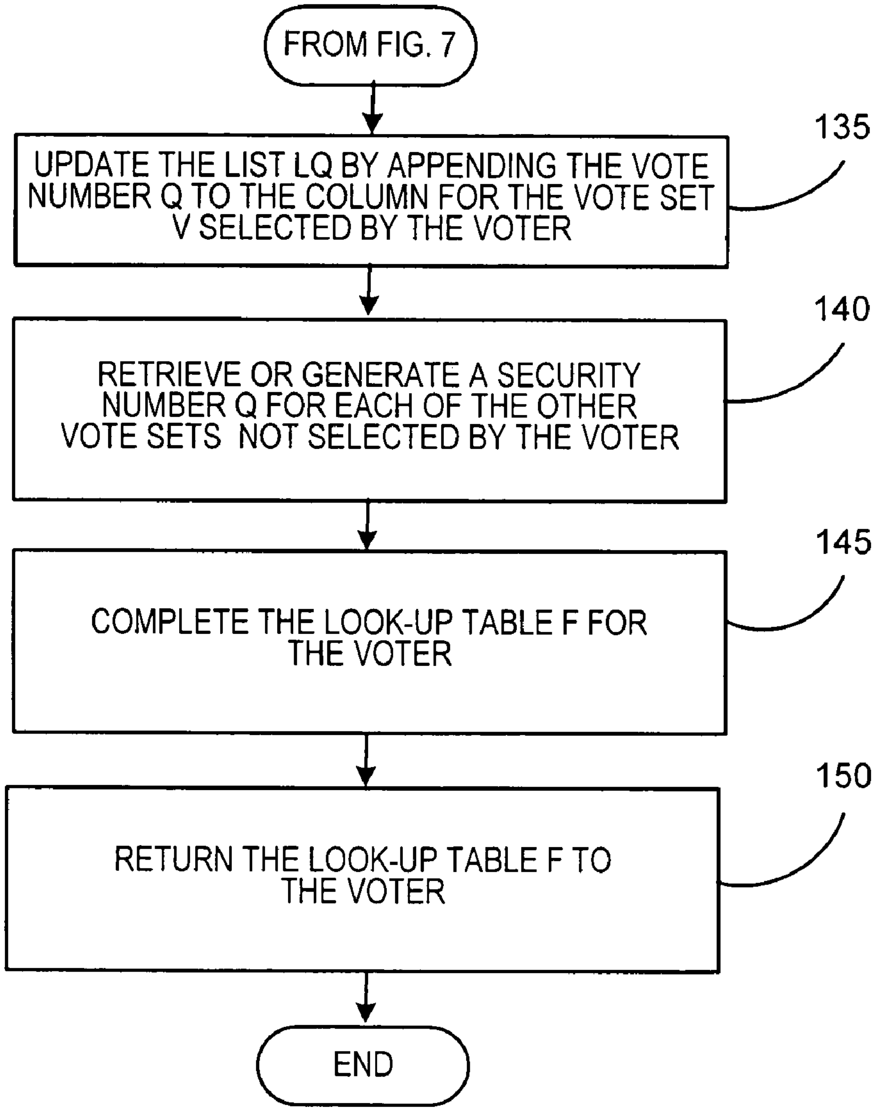

FIGS. 7 and 8 are flowcharts showing a method of casting votes in and administering an election according to an embodiment of the present invention. The method of FIGS. 7 and 8 employs the concepts described above and may be implemented using the network 5 shown in FIG. 1. As will be appreciated, the method shown in FIGS. 7 and 8 is repeated for each voter in the precinct 15 during the voting period.

The method begins at step 100, wherein a voter in the precinct 15 uses a voting machine 10 to cast his or her vote. In particular, the voter enters his or her identity A into the voting machine 10, such as through a keyboard, a touch screen, a voice recognition unit, or another input device, and then makes each selection to form his or her vote set V. In step 105, the voting machine 10, upon receiving the voter's identity A, uses that identity A to retrieve the voter's predetermined phrase set S from the voting precinct server 20. Also at step 105, the voting machine 10 obtains the particular phrase P from the obtained phrase set S that corresponds to the particular vote set V that was selected by the voter and provides that phrase P to the voter. Preferably, the particular phrase P is not printed, but instead is displayed on a screen that is part of the voting machine 10 or is announced through headphones that are worn by the voter and attached to the voting machine 10. Next, at step 110, a receipt number R is generated by the voting machine 10 (using, for example, a pseudo random number generator) and returned to the voter, preferably on a voting receipt provided to the voter. The receipt number must be unique to the precinct 15, meaning that the same receipt number has not been previously provided to another voter. Thus, before providing the receipt number R to the voter, the voting machine 10 queries the voting precinct server 20, which maintains a list of all assigned receipt numbers, to determine whether the current receipt number R is in fact unique to the precinct. If it is not, then the voting machine 10 generates a new receipt number R and so on, until a unique one is obtained.

At step 115, the voting machine 10 transmits the voter's identity A and the assigned receipt number R to the voting precinct server 20. Upon receipt thereof, the voting precinct server 20 appends the voter's identity A and the assigned receipt number R, in association with one another, to the look-up table H, as shown in exemplary form in FIG. 4, being maintained by the voting precinct server 20. Then, at step 120, the voting machine 10 generates a vote number Q (using, for example, a pseudo random number generator) that, like the receipt number R, is unique to the precinct 15, meaning that it is not the same as another vote number or security number previously issued in the precinct 15. As described above, the uniqueness of the vote number Q is verified by checking with the voting precinct server 20, which maintains a list of all verification numbers and security numbers. At step 125, the voter's selected vote set V and the assigned receipt number R and vote number Q are transmitted by the voting machine 10 to the voting precinct server 20. Upon receipt thereof, the voting precinct server 20 appends the voter's selected vote set V and the assigned receipt number R and vote number Q, in association with one another, to the look-up table G, as shown in exemplary form in FIG. 5, being maintained by the voting precinct server 20. The voter's vote set V can be tallied (counted) by the precinct server 20 and just the final results for the precinct 15 transferred from the voting precinct server 20 to the election governing body computer 25, or alternatively each vote set for each voter forwarded to the election governing body computer 25 for counting.

Next, at step 130, the particular phrase P that was provided to the voter and the vote number Q assigned to the voter in step 120 are transmitted by the voting machine 10 to the voting precinct server 20. Upon receipt thereof, the voting precinct server 20 appends the particular phrase P that was provided to the voter and the vote number Q assigned to the voter, in association with one another, to the look-up table F being generated and maintained for the voter, as shown in exemplary form in FIG. 3. Next, at step 135 (FIG. 8), the look-up table LQ being maintained by the voting precinct server 20 is updated by appending the vote number Q assigned to the voter to the column of the look-up table LQ that corresponds to the particular vote set V selected by the voter. Then, at step 140, a separate security number Q is retrieved from each column of the non-selected vote sets of the look-up table LQ or generated for each of the non-selected vote sets.

At step 145, the look-up table F for the voter is completed by the voting precinct server 20 by appending to it for each of the other non-selected vote sets V, the corresponding phrase P from the voter's vote set S and a corresponding security number Q obtained in step 140. Thus, when the look-up table F is completed, it will include each possible phrase P that may be constructed from the voter's phrase set S along with an associated verification number Q (one vote number and a number of security numbers). At step 150, the completed look-up table F is then returned to the voter, preferably in the form of a paper printout. Alternatively, the completed look-up table F may be stored for the voter by the voting precinct server 20 or the election governing body computer 25, in which case the voter may later access it, such as through the Internet, when needed.

As stated above, the steps of FIGS. 7 and 8 are repeated for each voter in the precinct during the election period. Thus, at the end of the election period, each voter will have their own look-up table F, and the voting precinct server 20 will have created and stored the look-up tables H and G, that each include an entry for each voter, and the look-up table LQ, that includes at least one verification number for each possible vote set V in the election. In addition, at the end of the election period, the entries in each column of the look-up table LQ are preferably shuffled around for security purposes, such as, for example, by ordering the entries lexicographically. The look-up table LQ is then published in the precinct 15 (e.g., on paper or a posting on the Internet), preferably along with a list of all registered voters who have voted and the total number of security numbers. By publishing the total number of security numbers, the addition of security numbers by an election official attempting to alter the outcome of an election could easily be determined by knowing the number of voters that actually voted and the number of authorized security numbers. Also, the completed look-up table H is transmitted to the election governing body computer 25 and on to one election official, and the completed look-up table G is transmitted to the election governing body computer 25 and on to another election official.

Figure 9:
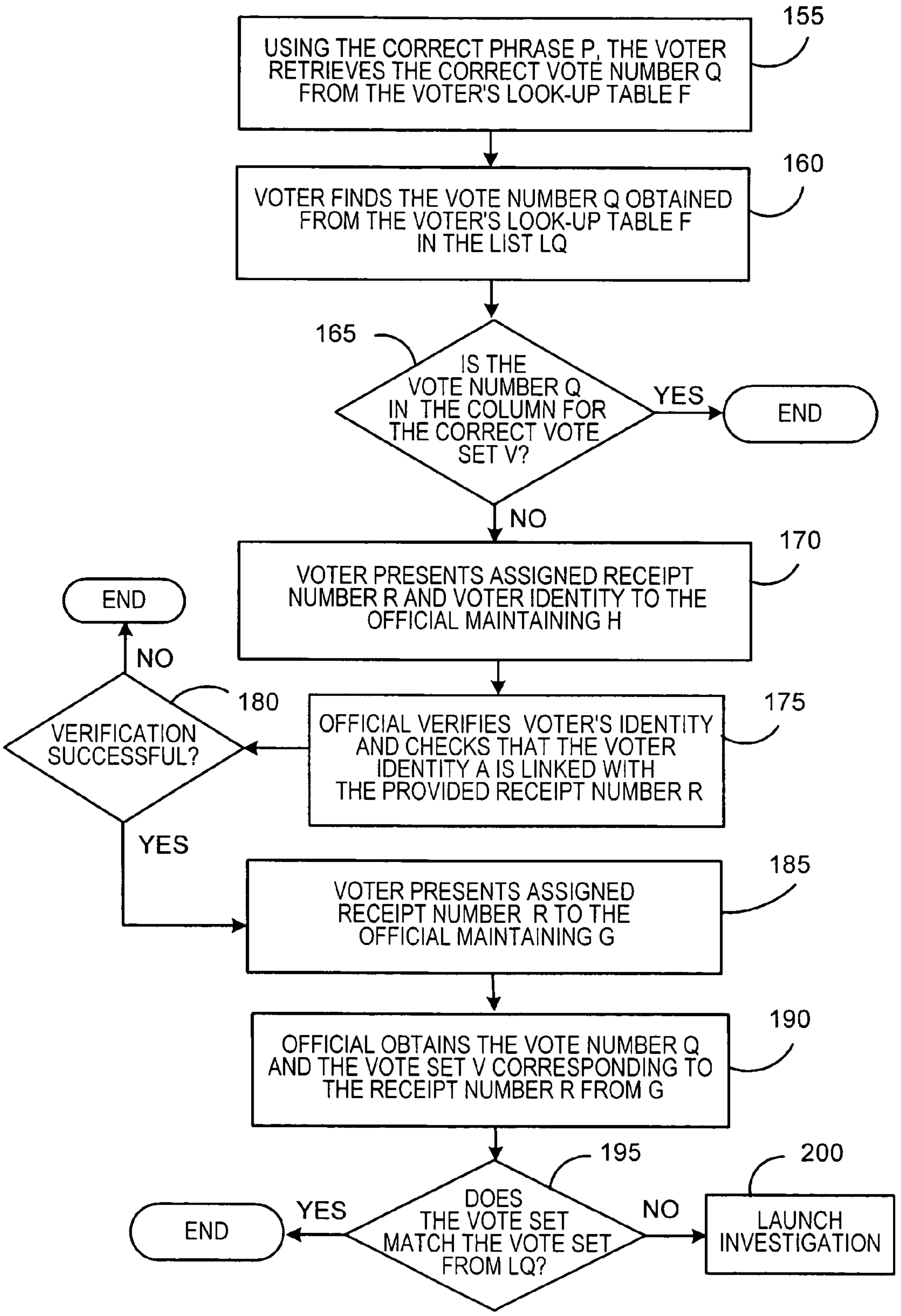
FIG. 9 is a flowchart showing a method of verifying and contesting a vote according to a further aspect of the present invention.

FIG. 9 is a flowchart showing a method for a voter to verify and contest a vote according to a further aspect of the present invention. The method of FIG. 9 may be employed by a voter to verify that his or her vote was properly counted (counted as actually voted), and if the voter believes his or her vote was either not counted at all or was not counted as actually voted, to contest the counting of the vote. The method begins at step 155, where the voter remembers the particular phrase P that was returned to him or her (step 105 of FIG. 7), and uses that phrase P to retrieve the correct vote number Q (assigned in step 120 of FIG. 7) from his or her look-up table F. Next, at step 160, the voter accesses the look-up table LQ (e.g., from a web site or other public source) and finds the vote number Q retrieved in step 155 in the look-up table LQ (preferably, the look-up table LQ is maintained via computer and may be electronically searched). At step 165, the voter determines whether the vote number Q is in the column for the particular vote set V that the voter believes he or she selected during the election. If the answer is yes, then that means that the voter's vote was counted correctly, and the method ends.

If, however, the answer at step 165 is no, meaning that the vote number Q is not in the column that the voter thinks it should be in, then the voter can contest the counting of his or her vote by going to the election official responsible for the look-up table H and presenting his or her voter identity A and receipt number R to that official in step 170. At step 175, that official verifies the voter's identity, such as by checking a document like a driver's license, and verifies that the voter's identity A and receipt number R are linked to one another in the look-up table H. At step 180, a determination is made as to whether the verification is successful. If the answer is no, then the voter is informed that the voter identity and receipt number are not linked and the method ends. Is the answer is yes, then, at step 185, the voter is directed to the election official responsible for the look-up table G. The voter presents his or her assigned receipt number R to that official. Next, at step 190, the official obtains the vote number Q and the vote set V from the look-up table G that corresponds to the provided receipt number R. The official also consults the look-up table LQ to obtain the vote set V with which the obtained vote number is associated. At step 195, the official determines whether the vote set V obtained from the look-up table G matches the vote set V obtained from the look-up table LQ. If they match, then the method ends, as the voter's votes have apparently been recorded and counted correctly. If, however, they do not match, then, at step 200, this indicates that the vote is not listed correctly on the look-up table LQ, and therefore not counted as intended. Preferably, the official will take some action to investigate the cause of the improper counting.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of processing a vote cast by a voter in an election that allows said voter to verify counting of said vote in said election, the method comprising:

receiving a voter identity for said voter;

receiving a vote set for said voter, said vote set being one of a plurality of possible vote set for said election and including a selection of one or more possible choices in said election, each of said choices coming from a respective one of one or more categories in said election;

providing a phrase to said voter that corresponds to said vote set, said phrase being one of a plurality of possible phrases, each of said possible phrases corresponding to a respective one of said possible votes sets and each of said possible phrases being determined prior to said election;

generating a unique receipt number for said voter and providing said receipt number to said voter;

storing said voter identity in association with said receipt number in a first table;

generating a unique vote number for said voter;

storing said vote set, said vote number and said receipt number in association with one another in a second table;

storing said phrase provided to said voter in association with said vote number and each of said possible phrases, other than said phrase provided to said voter, in association with a respective one of a plurality of security numbers in a third table and providing said third table to said voter; and storing said vote number in association with said vote set in a fourth table, said fourth table being publicly accessible after completion of said election for verification of counting of said vote by said voter.

2. The method according to claim 1, wherein at least one of said security numbers is a vote number for another voter or a newly generated number.

3. The method according to claim 2, wherein if said at least one of said security numbers is a newly generated number, said method further comprises:

adding said newly generated number to a corresponding vote set in the fourth table.

4. The method according to claim 1, wherein one or more of said first table, said second table, said third table and said fourth table is in the form of a look-up table.

5. The method according to claim 1, wherein said method is performed in a voting precinct and wherein said receipt number and said vote number are unique in said voting precinct.

6. A method of processing a vote cast by a voter in an election that allows said voter to verify counting of said vote in said election, the method comprising:

receiving a voter identity for said voter;

receiving a vote set for said voter, said vote including a selection of one or more possible choices in said election, each of said choices coming from a respective one or more categories in said election;

providing a phase to said vote that based on said vote set;

generation a unique receipt number for said voter and providing said receipt number to said voter;

storing said voter identity in association with said receipt number in a first table;

generating a unique vote number for said voter;

storing said vote set, said vote number and said receipt number in association with one another in a second table;

storing said phrase in association with said vote number in a third table and providing said third table to said vote; and storing said vote number in association with said vote set in a fourth table, said forth table being publicly accessible after completion of said election for verification of counting of said vote by said voter providing said first table to a first election official and said second table to a second election official;

said first election official receiving said voter identity and said receipt number from said voter after said election is over;

said first election official determining whether said voter identity is associated with said receipt number using said first table;

if it is determined that said voter identity is associated with said receipt number;

referring said voter to said second election official;

said second election official obtaining said vote number and said vote set using said second table and said receipt number;

said second election official determining with which one of a plurality of possible votes sets said vote number is associated in said fourth table; and said second election official determining whether said vote set obtained using said second table matches said one of a plurality of possible vote sets that said vote number is associated with in said fourth table;

wherein determination that said vote set does not match said one of a plurality of possible vote sets that said vote number is associated with indicates improper counting of said vote.

7. A method of processing a vote cast by a voter in an election that allows said voter to verify counting of said vote in said election, the method comprising:

receiving a voter identity for said voter;

receiving a vote set for said voter, said vote including a selection of one or more possible choices in said election, each of said choices coming from a respective one of one or more categories in said election;

providing a phrase to said voter that based on said vote set;

generating a unique receipt number for said voter and providing said receipt number to said voter;

storing said voter identity in association with said receipt number in a first table;

generating a unique vote number for said voter;

storing said vote set, said vote number and said receipt number in association with one another in a second table;

storing said phrase in association with said vote number in a third table and providing said third table to said voter;

storing said vote number in association with said vote set in a fourth table, said fourth table being publicly accessible after completion of said election for verification of counting of said vote by said voter;

receiving said voter identity and said receipt number from said voter after said election is over;

determining whether said voter identity is associated with said receipt number using said first table;

if it is determined that said voter identity is associated with said receipt number:

obtaining said vote number and said vote set using said second table and said receipt number;

determining with which one of a plurality of possible votes sets said vote number is associated in said fourth table; and determining whether said vote set obtained using said second table matches said one of a plurality of possible vote sets that said vote number is associated with in said fourth table;

wherein determination that said vote set does not match said one of a plurality of possible vote sets that said vote number is associated with indicates improper counting of said vote.

* * * * *